(12) United States Patent
Jung

(10) Patent No.: US 8,799,935 B2
(45) Date of Patent: Aug. 5, 2014

(54) MULTIMEDIA DEVICE HAVING A SUBSTRATE FIXING STRUCTURE

(75) Inventor: Young-sun Jung, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/287,548

(22) Filed: Nov. 2, 2011

(65) Prior Publication Data

US 2012/0124598 A1    May 17, 2012

(30) Foreign Application Priority Data

Nov. 16, 2010  (KR) ........................ 10-2010-0113903

(51) Int. Cl.
*G11B 33/12* (2006.01)
*H05K 7/12* (2006.01)

(52) U.S. Cl.
USPC ....... 720/654; 361/679.33; 361/802; 720/657

(58) Field of Classification Search
USPC ................ 720/600, 601, 648–652, 654, 657;
361/679.02, 679.33–679.39,
361/679.46–679.54, 679.57, 679.58, 704,
361/707, 719, 720, 730, 732, 802
See application file for complete search history.

(56) References Cited

U.S. PATENT DOCUMENTS

| | | | | |
|---|---|---|---|---|
| 5,277,615 A | * | 1/1994 | Hastings et al. | 361/679.32 |
| 5,521,793 A | * | 5/1996 | Dalgleish et al. | 361/752 |
| 7,639,491 B2 | * | 12/2009 | Mundt et al. | 361/679.37 |
| 2004/0017657 A1 | * | 1/2004 | Kim et al. | 361/690 |
| 2007/0053109 A1 | * | 3/2007 | Hayakawa et al. | 360/245.9 |
| 2009/0262507 A1 | * | 10/2009 | Fujikawa et al. | 361/759 |
| 2011/0065291 A1 | * | 3/2011 | Wei | 439/62 |

FOREIGN PATENT DOCUMENTS

| | | |
|---|---|---|
| JP | 2009-164497 A | 7/2009 |
| KR | 0127214 U | 11/1994 |
| KR | 1998-019457 U | 7/1998 |
| KR | 2000-0007293 U | 4/2000 |
| KR | 10-2004-0094031 | 11/2004 |
| KR | 10-2006-0065959 | 6/2006 |

OTHER PUBLICATIONS

Korean Office Action issued Oct. 10, 2012 in counterpart Korean Patent Application No. 10-2010-0113903 (3 pages, in Korean).

* cited by examiner

*Primary Examiner* — Nathan Danielsen
(74) *Attorney, Agent, or Firm* — NSIP Law

(57) ABSTRACT

A multimedia device including a back-end substrate that includes a heat source and a reproducing unit that is configured to reproduce an audio and/or a video signal based on data read from a storage medium, a housing that accommodates a back-end substrate and comprises an upper cover and a lower base which are respectively disposed above and under the back-end substrate, and a heat-dissipating structure that is formed on at least one of the upper cover and the lower base and contacts a side of the back-end substrate, a support post formed on the lower cover that is configured to support a lower surface of the back-end substrate, and a push post that is configured to position an upper edge of the back-end substrate with respect post the support post.

22 Claims, 6 Drawing Sheets

MULTIMEDIA DEVICE HAVING A SUBSTRATE FIXING STRUCTURE

CROSS-REFERENCE TO RELATED PATENT APPLICATION

This application claims the benefit of Korean Patent Application No. 10-2010-0113903, filed on Nov. 16, 2010, in the Korean Intellectual Property Office, the entire disclosure of which is incorporated herein by reference for all purposes.

BACKGROUND

1. Field

The following description relates to multimedia devices having an efficient substrate-fixing and/or heat-dissipating structure.

2. Description of the Related Art

An electronic device, in which heat-generating components are mounted on a substrate, needs to have a stable and simple substrate-fixing and heat-dissipating structure. In general, various components are used to build a substrate-fixing and heat-dissipating structure. However, in the context of designing and manufacturing compact electronic devices, the use of additional components makes it difficult to manufacture compact electronic products. Thus, the development of a compact heat sink for cooling components is required.

A multimedia device includes a system on chip (SoC) as a codec device that processes multimedia sources. The codec device generates a large amount of heat, and thus, an efficient heat transfer structure or an efficient heat dissipating structure is required. In general, in contrast to a multimedia device use on its own or as a standalone device, multimedia devices must be light, thin, and simple when used or installed in smart televisions. Accordingly, a multimedia device which is light, thin, and simple, which is capable of effectively coping with internal heat generation, and which comprises economically manufactured components is required.

SUMMARY

In one general aspect, there is provided a multimedia device. The multimedia device includes a back-end substrate comprising a reproducing unit that is configured to reproduce at least one of an audio signal and a video signal based on data read from a storage medium, and a housing that accommodates the back-end substrate and that comprises an upper cover and a lower base which are respectively disposed above and under the back-end substrate. The lower base may have formed thereon a support post that is configured to support a lower surface of the back-end substrate, and a push post that is configured to position an upper edge of the back-end substrate with respect to the support post.

The multimedia device may include a position determining unit that restricts movement of the back-end substrate in a planar direction that is formed on the lower base.

The multimedia device may include a position determining unit that includes a stopper that contacts a lateral edge portion of the back-end substrate and a support portion that supports a lower surface of an edge portion of the back-end substrate.

The multimedia device may include an optical drive module that is configured to drive the storage medium. The storage medium may be an optical disk.

The multimedia device may include a back-end substrate that includes an interface through which at least one of an audio signal and a video signal is output.

The multimedia device may include an interface trough which at least one of an audio signal and a video signal is output. The interface may include at least one of a high-definition multimedia interface (HDMI) and a universal serial bus (USB).

The multimedia device may include a back-end substrate that includes an Ethernet device that is configured to download content streams over the Internet.

The multimedia device may include an optical drive module that is configured for at least one of reading data from the optical disk and writing data to the optical disk.

The multimedia device may include an optical drive module is an optical drive module configured for use in a laptop computer.

The multimedia device may be installed or incorporated in an electronic device. The electronic device may be one of a portable game console, a portable/personal multimedia player (PMP), a portable lap-top PC, a desktop PC, a high definition television (HDTV), a smart TV, an optical disc player, and an optical disc recorder.

In another aspect there is provided a multimedia device. The multimedia device includes a back-end substrate comprising a heat source and a reproducing unit that is configured to reproduce at least one of an audio signal and a video signal based on data read from a storage medium, and a housing that accommodates the back-end substrate and that comprises an upper cover and a lower base which are respectively disposed above and under the back-end substrate. The lower base may have formed thereon a heat dissipating structure that contacts a side of the back-end substrate, a support post that is configured to support a lower surface of the back-end substrate, and a push post that is configured to position an upper edge of the back-end substrate with respect to the support post.

The multimedia may include a position determining unit that restricts movement of the back-end substrate in a planar direction that is formed on the lower base.

The multimedia device may include a position determining unit that includes a stopper that contacts a lateral edge portion of the back-end substrate and a support portion that supports a lower surface of an edge portion of the substrate.

The multimedia device may include an optical drive module that is configured to drive the storage medium. The storage medium may be an optical disk.

The protruding type heat dissipating structure may contact a lower surface of the back-end substrate at an area that is spaced apart from the heat source so as to support the back-end substrate from below and to allow heat generated in the heat source to be transferred to the lower base.

The multimedia device may be installed or incorporated in an electronic device. The electronic device may be one of a portable game console, a portable/personal multimedia player (PMP), a portable lap-top PC, a desktop PC, a high definition television (HDTV), a smart TV, an optical disc player, and an optical disc recorder.

Other features and aspects may be apparent from the following detailed description, the drawings, and the claims.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
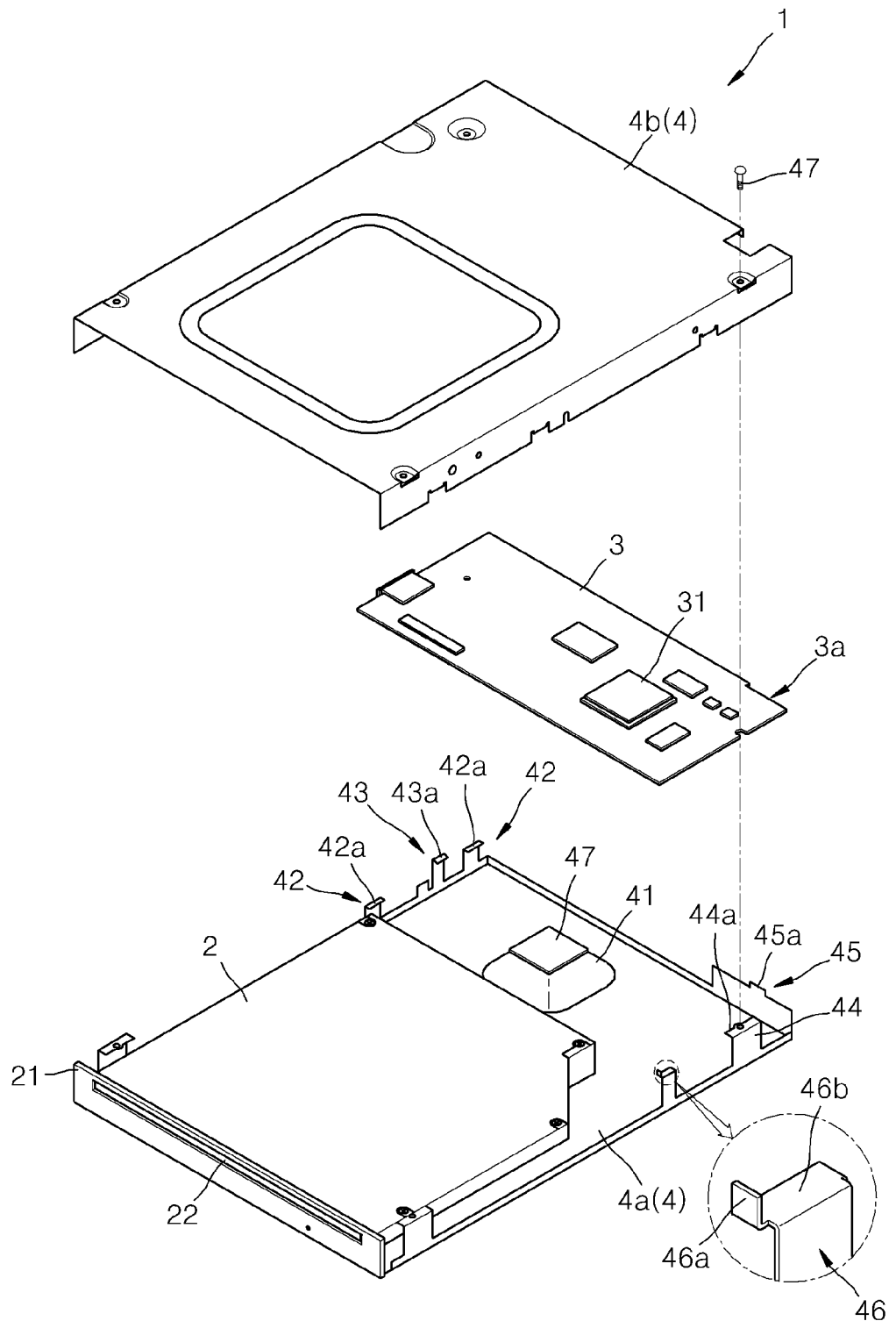
FIG. 1 is a drawing illustrating an example of an electronic device.
Figure 2:
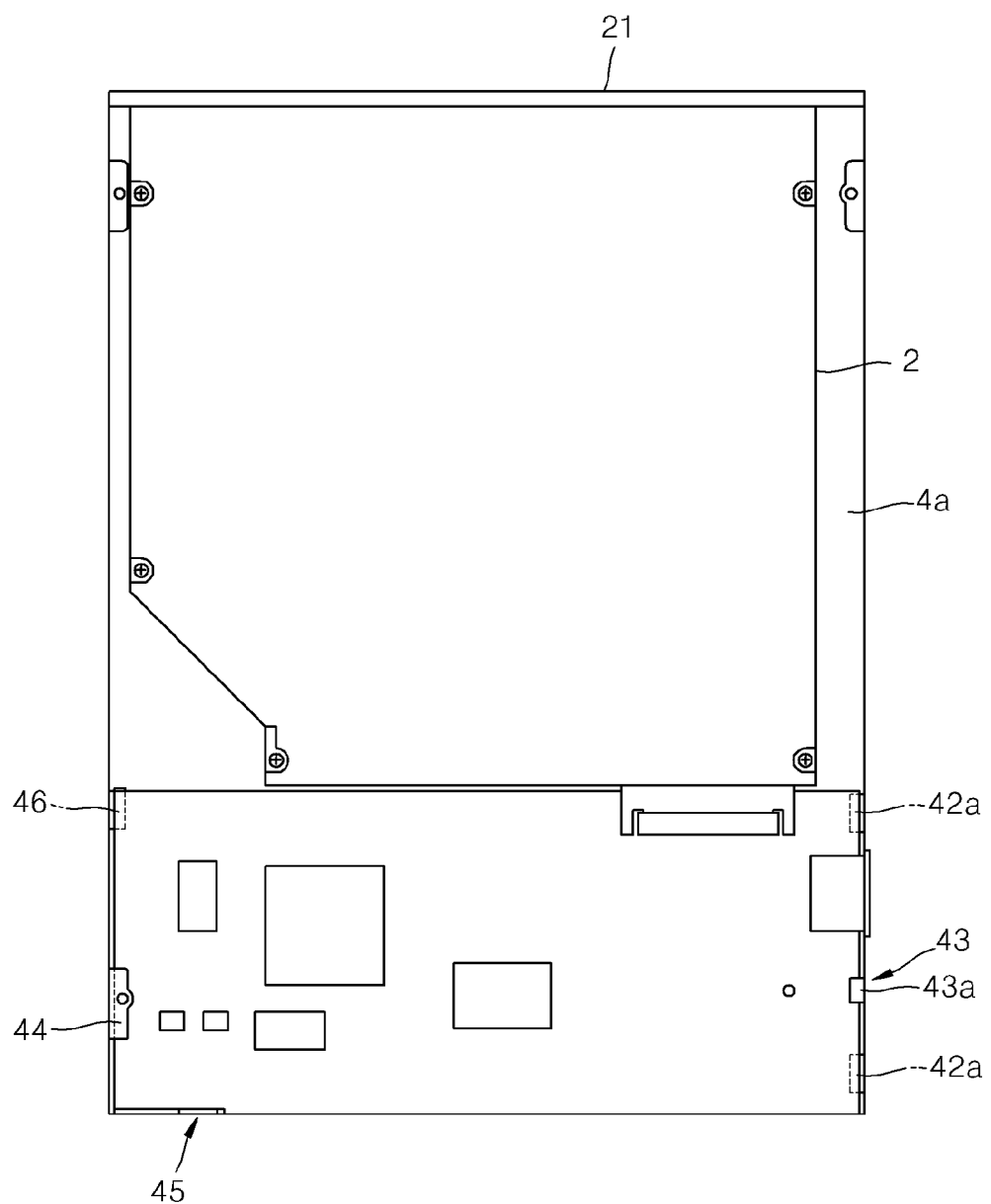
FIG. 2 is a drawing illustrating an example of an internal structure of the multimedia device.

FIG. 1 is a drawing illustrating an example of a multimedia device 1 (e.g., an AV player), which is an example of an electronic device. For example, the multimedia device 1 may be an AV player, such as an optical disc player or the like. FIG. 2 is a drawing illustrating an example of an internal structure of the multimedia device 1 of FIG. 1 in a coupled state.

Referring to FIGS. 1 and 2, the multimedia device 1 includes a drive module 2, a back-end substrate 3, and a housing 4. The drive module 2 may be, for example, an optical drive module or the like. The housing 4 may comprise a lower base 4a and an upper cover 4b. The lower base 4a and the upper cover 4b may be combined to define an internal cavity in which various components (e.g., the optical drive module 2, the back end substrate 3, etc.) may be installed.

The optical drive module 2 may include a panel 21 at a front thereof. A slot 22, through which a storage medium (e.g., a disk) is inserted, may be formed in the panel 21. The drive module 2 (e.g., an optical drive module) is designed for standardized laptop computers and other electronic devices. The drive module 2 may include well-known components such as a pickup unit (e.g., an optical pickup device), a servo part controlling the pickup unit, and a digital signal processor (DSP) processing a signal from the pickup unit.

The back-end substrate 3 may include an audio unit and/or a video unit that includes a heat source 31 that generates heat during operation. For example, the heat source 31 may be a system on chip (SoC) that processes a signal transmitted from the drive module 2. The back-end substrate may also include an output interface that is configured to output a signal (e.g., a voice-image signal). An output interface will be described in detail later.

The housing 4 is formed of a highly thermally conductive material such as a metal plate. The housing 4 accommodates the disk module 2 and the back-end substrate 3. The housing 4 includes the lower base 4a which includes a protruding, heat-dissipating structure 41 (also referred to as a heat transfer or cooling structure), on which an insulating thermal conductive layer 47 is formed. The insulting thermal conductive layer 4 contacts a lower surface of the back-end substrate 3 in order to dissipate heat generated by the heat source 31.

The upper cover 4b, the optical disk module 2, and the back-end substrate 3 are installed on the lower base 4a. The upper cover 5b protects the lower base 4a and the components installed there between. The lower base 4a includes at least one support post 42 having an upper support surface 42a configured to support the lower surface of the back-end substrate 3 and a non-elastic push post 43 having a finger-type push portion 43a that fixes or positions an upper edge of the back-end substrate 3 to the support post 42. The at least one support post 42 and the non-elastic push post 43 may be formed along an edge of the lower base 4a. The lower base 4a may further include a fixing post 44 that firmly fixes the back-end substrate 3 and that has a similar form as the support post 42. The fixing post 44 may be formed on a first side of the lower base 4a. The upper cover 4b covering the back-end substrate 3 may be fixed to the fixing post 44 using a screw 47 (see FIG. 3). The lower base 4a may also include a position determining unit which restricts movement of the back-end substrate 3 in left and right directions. The position determining unit may be formed on a second side of the lower base 4a on two edges of the back-end substrate 3. For example, the position determining unit restricts movement of the back-end substrate 3 in a planar direction relative to the lower base 4a. A first position determining portion 45 of the position determining unit is disposed at a back end portion of the lower base 4a and has a protrusion 45a that engages with a step portion 3a formed on the back-end substrate 3. A second position determining portion 46 may be disposed at a first side of the fixing post 44 (e.g., the left side in FIG. 2) and includes a stopper 46a, which is restricted by contact by a lateral edge portion of the back-end substrate 3, and a lower surface-supporting surface 46b that supports the lower surface of the back-end substrate 3.

Figure 3:
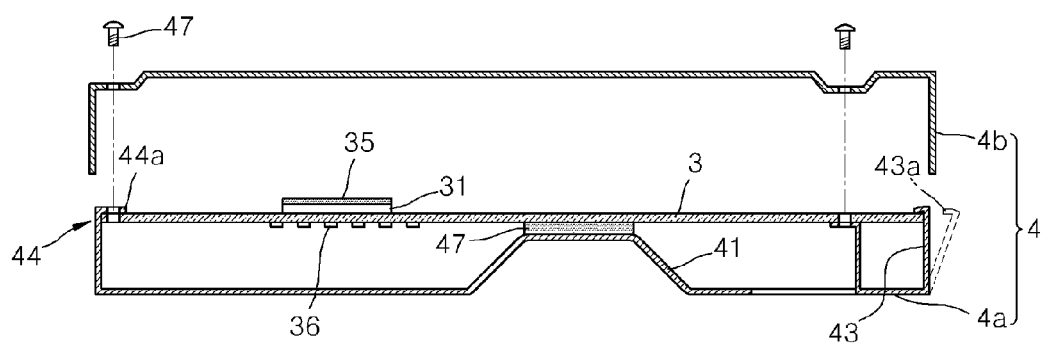
FIG. 3 is a drawing illustrating example of a substrate of a multimedia device, and an upper cover and a lower base respectively placed above and under the substrate in a separated state before being coupled.
Figure 4:
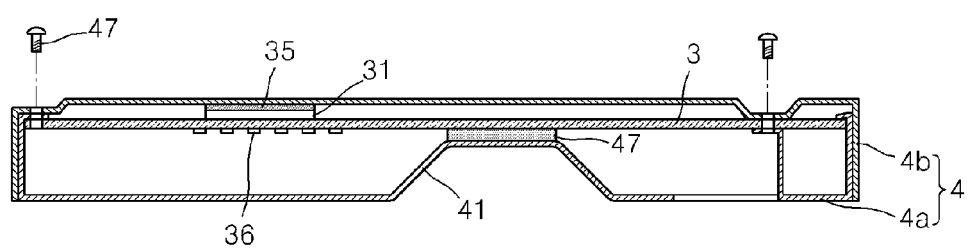
FIG. 4 is a drawing illustrating an example of a lower base of a multimedia device that supports a substrate, the view also showing a restriction structure of the substrate along a planar direction of the lower base.
Figure 5:
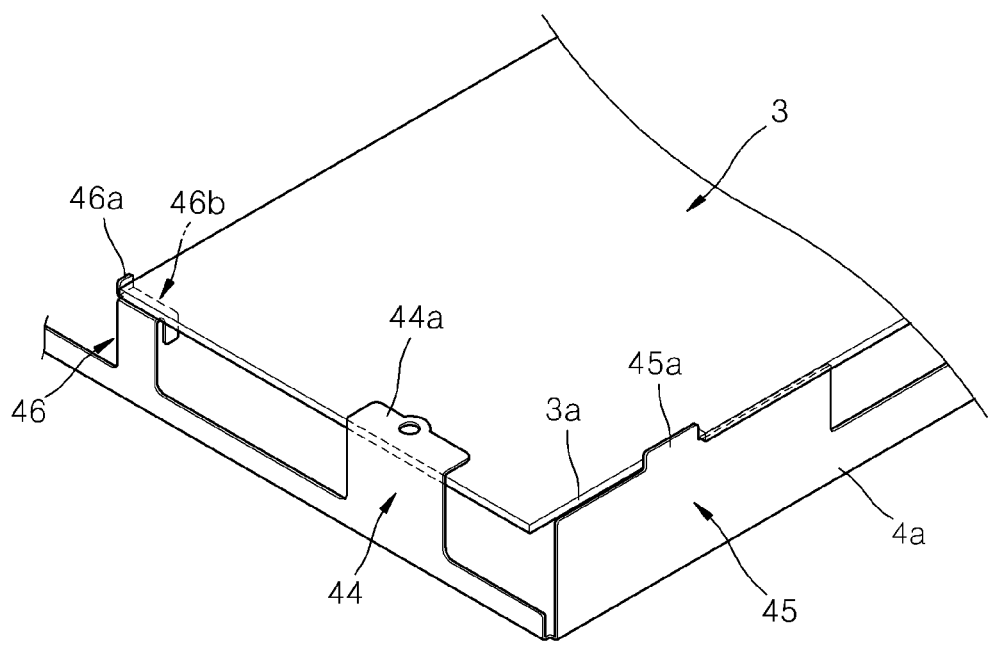
FIG. 5 is a drawing illustrating an example of a substrate of a multimedia device, and an upper cover and a lower base above and under the substrate that are coupled to one another.

FIG. 3 illustrates the back-end substrate 3 of the multimedia device 1, and the upper cover 4b and the lower base 4a respectively placed above and under the back-end substrate 3 in a separated state before being coupled. The multimedia device 1 is an example of an electronic device. FIG. 4 is a drawing illustrating an example of a combined state of the upper cover 4b and the lower base 4a of the multimedia device. FIG. 5 is a drawing illustrating an example of a supporting structure of the back-end substrate 3 supported by using the position determining unit.

Referring to FIGS. 3 and 4, the lower base 4a and the upper cover 4a are coupled to each other with the back-end substrate 3 interposed there between. A heat-dissipating structure 41 of the lower base 4a contacts the lower surface of the back-end substrate 3. The multimedia device may include an insulating thermal conductive layer 47 that is interposed between the heat-dissipating structure 41 and the back-end substrate 3 to electrically insulate the heat-dissipating structure 41 and the back-end substrate 3. The heat-dissipating structure 41 is disposed so as to be spaced apart from the heat source 31 because an electronic component 36 is disposed below the heat source 31. For example, a cooling structure may contact a free portion of the back-end substrate 3 if the cooling structure cannot be directly placed under the heat source 31 of an electronic device. Moreover, it may be beneficial for the heat-dissipating structure 41 to be spaced apart from the heat source 31 and/or for the cooling structure to contact a free portion of the back-end substrate 3 if the heat source 31 contacts the upper cover 4b. An insulating thermal conductive layer 35 may be interposed between the heat source 31 and the upper cover 4b. The support post 42 that is formed on the lower base 4a may be integrally formed with the lower base 4a such that the lower base 4a and the support post 42 may be a single unit. The support post 42 supports the lower surface of the back-end substrate 3 when in an upright position. Also, the push portion 43a of the non-elastic push post 43 formed on an edge of the non-elastic push post 43 contacts an upper edge of the back-end substrate 3. The non-elastic push post 43 is a structure that does not deform elastically and thus bends when acted upon by a force or maintains a reinforced state.

Referring to the position determining unit of the back-end substrate 3 illustrated in FIG. 5, a movement of the back-end substrate in a planar direction of the lower base 4a is restricted due to the first position determining portion 45 and the second position determining unit 46. The first position determining portion 45 is a portion of the lower base 4a. As an example, the first position determining portion 45 may be formed by bending. The first position determining unit 45 may also be formed by molding. A protrusion 45a of an upper portion of the first position determining unit 45 is inserted into a step (or recess) portion 3a formed in the back-end substrate 3. The protrusion 45a is positioned to restrict movement of the back-end substrate 3 in left or right directions. The second position determining portion 46 may be located to face the first position determining portion 45 with the back-end substrate 3 disposed there between. A lower surface of an edge portion of the back-end substrate 3 contacts the supporting surface 46b of the second position determining portion 46. The second position determining portion 46 may also have a stopper 46a which engages a lateral surface of the edge portion of the back-end substrate 3. The stopper 46a of the second position determining portion 46 may block movement of the back-end substrate 3. Accordingly, the back-end substrate 3 is not able to move in a horizontal direction. In other words, the back-end substrate may not move between the first and second position determining portions 45 and 46.

As described above, the substrate-fixing and heat-dissipating structure of the multimedia device may be formed using body portions of the housing 4 and does not require any additional element. Accordingly, the heat-dissipating structure does not restrict the minimizing of sizes of the electronic device and a multimedia device using the electronic device.

As a non-limiting example, the optical drive module 2 of the multimedia device 1 may have a structure that complies with SFF-8552 specifications. In particular, the drive module may have a slim structure.

Figure 6:
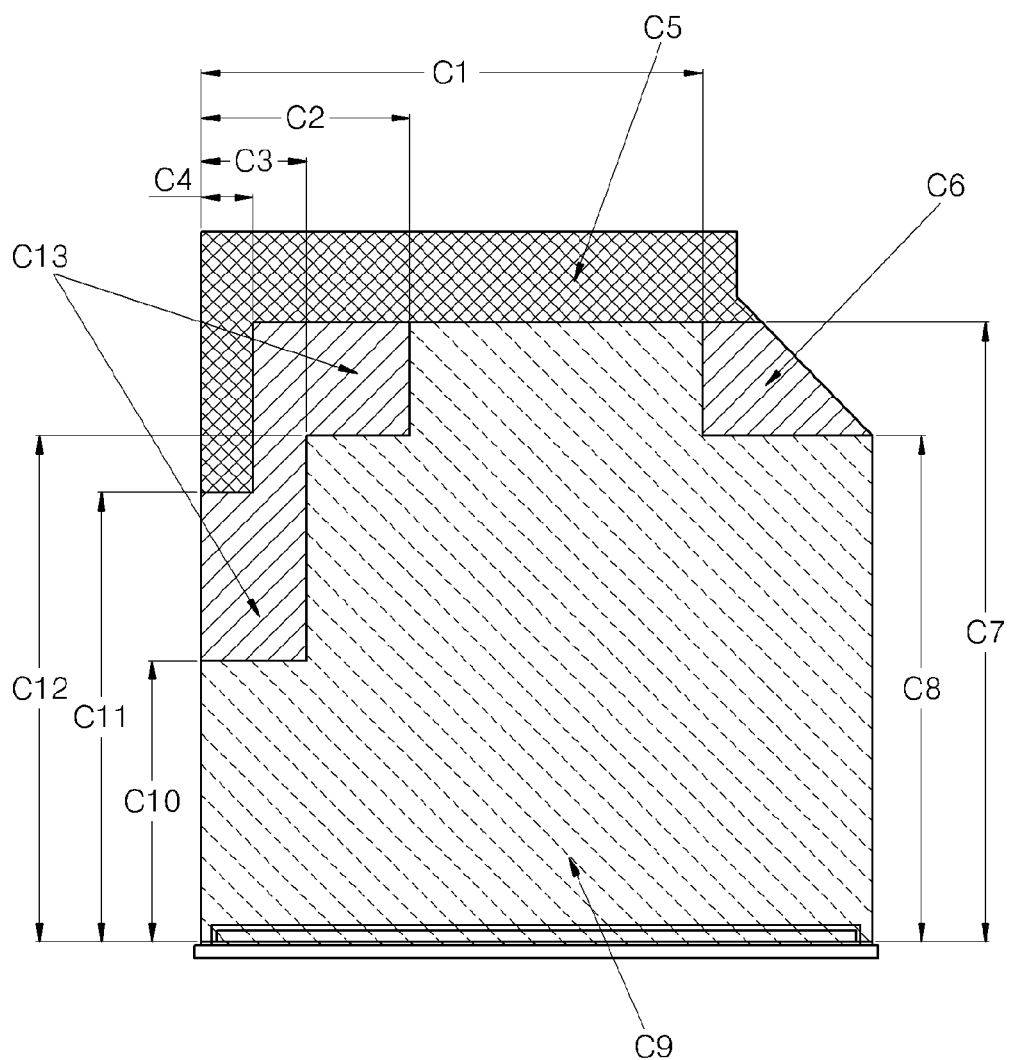
FIG. 6 is a drawing illustrating an example of small form factors (SFF) standards regarding optical disk drives (ODD).

FIG. 6 illustrates a part of a blueprint of a 9.5 mm slim type optical disk drive (ODD) defined by small form factors (SFF)-8552, showing all dimensions of the elements illustrated in FIGS. 1 through 6. Details can be found at SFF-8552 Rev 1.4 RC (see ftp://ftp.seagate.com/sff). The SFF-8552 Specification Rev. 1.4 RC is incorporated herein in its entirety.

TABLE 1

| Designator | Dimension (mm) | Tolerance (mm) |
|---|---|---|
| A1 | 97.40 | ±.20 |
| A2 | 65.10 | ±.20 |
| A3 | 52.60 | ±.20 |
| A4 | 21.25 | ±.30 |
| A5 | 3.80 | ±.20 |
| A6 | 6.00 | ±.30 |
| A7 | 6.15 | ±.30 |
| A8 | 4X M2 | Depth 1.5 Min |
| A9 | 3X 3.20 | ±.20 |
| A10 | 128.00 | ±.20 |
| A11 | 102.60 | ±.20 |
| A12 | 9.50 | +.50/−.20 |
| A13 | 3X 2.30 | ±.20 |
| A14 | 3X M2 | Depth 1.5 Min |

TABLE 1-continued

| Designator | Dimension (mm) | Tolerance (mm) |
|---|---|---|
| A15 | 89.85 | ±.85 |
| A16 | 114.65 | ±.75 |
| A17 | 110.10 | ±.20 |
| A18 | 27.30 | ±.20 |
| A19 | 5.30 | ±.20 |
| A20 | 4.60 | ±.20 |
| A21 | XXX | ±.30 |
| A22 | 126.00 | Max |
| A23 | 2.00 | Min |
| A24 | XXX | ±.30 |
| A25 | 126.10 | ±.20 |
| A26 | 27.30 | ±.20 |
| A27 | 110.10 | ±.20 |
| A28 | 2X M2 | Depth 1.5 Min |
| A29 | 2X 6.80 | ±.20 |
| A30 | 3.60 | ±.30 |
| A31 | | |
| A32 | 3.00 | Max |
| A33 | 10.50 | Max |
| A34 | 0.90 | ±.20 |
| A35 | 90.0 degrees | ±3.0 degrees |
| A36 | XXX | ±.30 |
| B1 | 0.90 | |
| B2 | 12.00 | |
| B3 | 0.00 | |
| C1 | 96.20 | |
| C2 | 40.00 | |
| C3 | 20.00 | |
| C4 | 10.00 | |
| C5 | Less than 1 | Newtons |
| C6 | Less than 0.5 | Newtons |
| C7 | 110.00 | |
| C8 | 90.00 | |
| C9 | 0.00 | Newtons |
| C10 | 50.00 | |
| C11 | 80.00 | |
| C12 | 90.00 | |
| C13 | Less than 0.5 | Newtons |

By using the strict external forms and dimensions presented above, various ODDs of different companies may be installed in laptop computers regardless of the ODD manufacturers.

However, laptop computer-only ODDs cannot be applied to other application devices. The development of a compact multimedia device may be manufactured with low costs by forming an efficient heat dissipating (e.g., cooling) structure. For example, the heat dissipating (e.g., cooling) structure may be formed in an ODD that are installed in currently manufactured smart televisions. As an example, an ODD that is installed in a laptop computer, particularly an ODD in accordance with SFF-8552, may be mounted as an optical drive module of a multimedia device. Accordingly, when designing a multimedia device, an additional optical drive module is not necessary, and thus, design costs are reduced. As an example, a single-piece optical drive module may be used in both a laptop computer and a multimedia device, thereby reducing the manufacturing costs.

Figure 7:
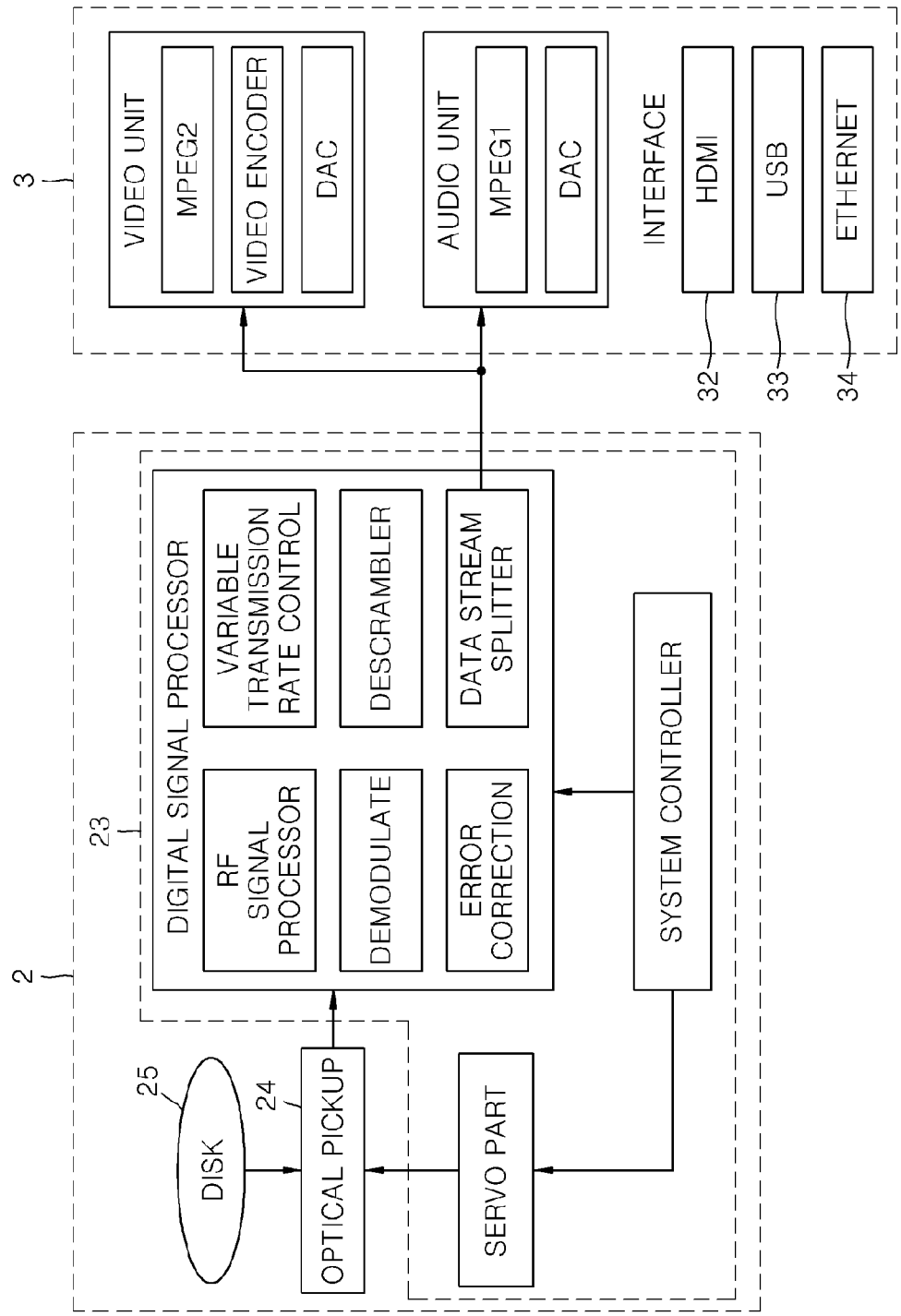
FIG. 7 is a diagram illustrating an example of a multimedia device. Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 7 is a diagram illustrating an example of a multimedia device.

As illustrated in FIG. 7, an optical drive module 2 includes an optical pickup 24 that is configured to read data from and/or write data to a storage medium 25 (e.g., a disk), and a front-end part 23. The front-end part 23 may include a servo unit 231 that controls the optical pickup 24 and a digital signal processor (DSP) including an RF signal processor that processes a signal transmitted from the optical pickup 24, a demodulating unit, an error correction unit, a variable transmission rate control unit, descrambler and a stream (data) splitter.

A back-end substrate 3 may individually decode an audio signal and/or a video signal from the front-end part 23 using, for example, an MPEG decoder, and convert the audio and/or video signals using a digital-analog converter (DAC) to output an analog audio-video signal.

The back-end substrate 3 may include an output interface that is configured to input/output an audio/visual signal. For example, the output interface may be a high-definition multimedia interface (HDMI) 32. The back-end substrate 3 may also include an Ethernet device 34 that is configured to download content streams from a content source. For example, the Ethernet device 34 may be configured to communicate with the Internet to download content streams. The back-end substrate 3 may further include a universal serial bus (USB) 33 that is configured to control the whole system. For example, the USB 33 may be configured to control the drive module 2.

The optical drive module 2 may reproduce CD/DVD data and Blu-ray data. For example, the optical drive module 2 may read data from and/or write data to a CD, DVD, and/or Blu-ray disc (BD).

The optical drive module 2 may have a slot-in type disk transporting structure. However, the optical drive module 2 may also use a typical tray type transporting structure. The above-described optical drive module may reproduce data from a disk, and may write data to the disk.

A substrate may be structurally supported. For example, the substrate is supported using an additional supporting element that is integrally formed with a lower base. Accordingly, a light, thin, and simple multimedia device may be designed. In addition, heat is dissipated (discharged) via a structure of a housing from a codec chip of a microprocessor or a multimedia device which generates a large amount of heat. Accordingly, in accordance with an aspect, an additional heat dissipating structure or a cooling structure such as a heat sink or a cooling fan is not required. Also, when forming a multimedia device having the above-described structure, an additionally designed optical drive module (or an optical disk drive) is not used. In other words, some aspects may be installed or incorporated into standardized optical disk drives for laptop computers. Accordingly, the multimedia device may be manufactured easily at low costs and all types of optical disk drives that comply with standards may be applied regardless of the manufacturer.

In an aspect, there is provided a multimedia device in which an internal substrate is economically fixed and effective heat dissipation of the substrate is achieved. The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multimedia device comprising:
a back-end substrate comprising a reproducing unit that is configured to reproduce at least one of an audio signal and a video signal based on data read from a storage medium; and
a housing that accommodates the back-end substrate and that comprises an upper cover and a lower base which are respectively disposed above and under the back-end substrate,
wherein the lower base has formed thereon a support post that is configured to support a lower surface of the back-end substrate, and a non-elastic push post that is configured to position an upper edge of the back-end substrate with respect to the support post.

2. The multimedia device of claim 1, wherein a position determining unit that restricts movement of the back-end substrate in a planar direction is formed on the lower base.

3. The multimedia device of claim 2, wherein the position determining unit comprises a stopper that contacts a lateral edge portion of the back-end substrate and a support portion that supports a lower surface of an edge portion of the back-end substrate.

4. The multimedia device of claim 3, wherein the optical drive module is an optical drive module configured for use in a laptop computer.

5. The multimedia device of claim 1, further comprising an optical drive module that is configured to drive the storage medium,
wherein the storage medium is an optical disk.

6. The multimedia device of claim 5, wherein the back-end substrate further comprises an interface through which at least one of an audio signal and a video signal is output.

7. The multimedia device of claim 6, wherein the interface comprises at least one of a high-definition multimedia interface (HDMI) and a universal serial bus (USB).

8. The multimedia device of claim 7, wherein the back-end substrate further comprises an Ethernet device that is configured to download content streams over the Internet.

9. The multimedia device of claim 6 wherein the back-end substrate further comprises an Ethernet device that is configured to download content streams over the Internet.

10. The multimedia device of claim 6, wherein the optical drive module is configured for at least one of reading data from the optical disk and writing data to the optical disk.

11. The multimedia device of claim 6, wherein the optical drive module is an optical drive module configured for use in a laptop computer.

12. An electronic device comprising the multimedia device of claim 1.

13. The electronic device of claim 12, wherein the electronic device is one of a portable game console, a portable/personal multimedia player (PMP), a portable lap-top PC, a desktop PC, a high definition television (HDTV), a smart TV, an optical disc player, and an optical disc recorder.

14. The multimedia device of claim 1, wherein the support post and/or push post is formed along an edge of the lower base.

15. A multimedia device comprising:
- a back-end substrate comprising a heat source and a reproducing unit that is configured to reproduce at least one of an audio signal and a video signal based on data read from a storage medium; and
- a housing that accommodates the back-end substrate and that comprises an upper cover and a lower base which are respectively disposed above and under the back-end substrate,
- wherein at least one of the upper cover and the lower base has formed thereon a heat dissipating structure that contacts a side of the back-end substrate, and
- wherein the lower base has formed thereon a support post that is configured to support a lower surface of the back-end substrate, and a non-elastic push post that is configured to position an upper edge of the back-end substrate with respect to the support post.

16. The multimedia device of claim 15, wherein a position determining unit that restricts movement of the back-end substrate in a planar direction is formed on the lower base.

17. The multimedia device of claim 16, wherein the position determining unit comprises a stopper that contacts a lateral edge portion of the back-end substrate and a support portion that supports a lower surface of an edge portion of the substrate.

18. The multimedia device of claim 15, further comprising an optical drive module that is configured to drive the storage medium,
wherein the storage medium is an optical disk.

19. The multimedia device of claim 15, wherein the protruding type heat dissipating structure contacts a lower surface of the back-end substrate at an area that is spaced apart from the heat source so as to support the back-end substrate from below and to allow heat generated in the heat source to be transferred to the lower base.

20. An electronic device comprising the multimedia device of claim 15.

21. The electronic device of claim 20, wherein the electronic device is one of a portable game console, a portable/personal multimedia player (PMP), a portable lap-top PC, a desktop PC, a high definition television (HDTV), a smart TV, an optical disc player, and an optical disc recorder.

22. The multimedia device of claim 15, wherein the support post and/or push post is formed along an edge of the lower base.

* * * * *